United States Patent
Bordoz et al.

(10) Patent No.: US 9,156,316 B2
(45) Date of Patent: Oct. 13, 2015

(54) VEHICLE TIRE WITH INTERRUPTED CARCASS AND COMPRISING A LAYER OF CIRCUMFERENTIAL REINFORCEMENT ELEMENTS

(75) Inventors: Francis Bordoz, Clermont-Ferrand (FR); Alain Valle, Cebazat (FR); Pascal Prost, Riom (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 268 days.

(21) Appl. No.: 13/140,762

(22) PCT Filed: Dec. 9, 2009

(86) PCT No.: PCT/EP2009/066733
§ 371 (c)(1), (2), (4) Date: Sep. 2, 2011

(87) PCT Pub. No.: WO2010/069839
PCT Pub. Date: Jun. 24, 2010

(65) Prior Publication Data
US 2011/0303340 A1       Dec. 15, 2011

(30) Foreign Application Priority Data
Dec. 17, 2008   (FR) ..................................... 08 58725

(51) Int. Cl.
*B60C 9/18* (2006.01)
*B60C 9/22* (2006.01)
*B60C 9/08* (2006.01)
(Continued)

(52) U.S. Cl.
CPC ............. *B60C 9/2204* (2013.04); *B60C 9/0207* (2013.04); *B60C 9/08* (2013.01); *B60C 15/0018* (2013.04); *B60C 2009/2271* (2013.04); *B60C 2200/10* (2013.04); *Y10T 152/10855* (2015.01)

(58) Field of Classification Search
CPC ........ B60C 9/18; B60C 19/22; B60C 19/2204
See application file for complete search history.

(56) References Cited

U.S. PATENT DOCUMENTS 5,277,238 A * 1/1994 Kawabata et al. ............. 152/526
6,305,452 B1 * 10/2001 Sato .............................. 152/555
(Continued)

FOREIGN PATENT DOCUMENTS

EP   1 852 277   11/2007
EP   1 864 828   12/2007
(Continued)

*Primary Examiner* — Justin Fischer
(74) *Attorney, Agent, or Firm* — Cozen O'Connor

(57) ABSTRACT

A tire comprising a reinforcing structure of the carcass type and comprising under the tread strip a crown reinforcing structure consisting of at least two layers of reinforcing elements. The carcass-type reinforcing structure is produced in the form of two half-layers extending at least from the shoulders to the beads and each having an end under the tread strip, the crown reinforcing structure comprises at least one layer of circumferential reinforcing elements which are distributed in the transverse direction with a variable pitch and the pitch between the circumferential reinforcing elements is at a minimum in the region of the layer of circumferential reinforcing elements that radially face the ends of each of the half-layers of the carcass-type reinforcing structure.

6 Claims, 3 Drawing Sheets

(51) Int. Cl.
  *B60C 15/00* (2006.01)
  *B60C 9/02* (2006.01)

(56) References Cited

U.S. PATENT DOCUMENTS

| | | | |
|---|---|---|---|
| 6,883,570 B2 * | 4/2005 | Jardine et al. | 152/531 |
| 7,299,843 B2 * | 11/2007 | Osborne et al. | 152/526 |
| 2002/0174927 A1 | 11/2002 | Armellin | |

FOREIGN PATENT DOCUMENTS

| | | | |
|---|---|---|---|
| JP | 06048113 | * | 2/1994 |
| WO | WO 02/00451 | | 1/2002 |
| WO | WO 03/037656 | | 5/2003 |
| WO | WO 03/037657 | | 5/2003 |
| WO | WO 03/095242 | | 11/2003 |
| WO | WO 2004/018236 | | 3/2004 |

* cited by examiner

VEHICLE TIRE WITH INTERRUPTED CARCASS AND COMPRISING A LAYER OF CIRCUMFERENTIAL REINFORCEMENT ELEMENTS

RELATED APPLICATIONS

This is a U.S. national stage under 35 USC §371 of application No. PCT/EP2009/066733, filed on Dec. 9, 2009.

This application claims the priority of French application No. 08/58725 filed Dec. 17, 2008, the entire content of which is hereby incorporated by reference.

FIELD OF THE INVENTION

The invention relates to a tire intended to be fitted to a vehicle and, more particularly, intended to be fitted to a two-wheel vehicle such as a motorcycle.

Although not restricted to such an application, the invention will be described more particularly with reference to such a motorcycle, or motorbike, tire.

BACKGROUND OF THE INVENTION

The reinforcement that reinforcing tires and, notably, motorcycle tires, is currently—and usually—made up of a stack of one or more plies conventionally known as "carcass plies", "crown plies", etc. This way of naming the reinforcements stems from the method of manufacture which involves producing a series of semi-finished products in the form of plies, provided with elementary reinforcements, which are often longitudinal, which are subsequently assembled or stacked to build up a green tire. The plies are produced flat, with large dimensions, and are subsequently cut to suit the dimensions of a given product. The plies are also initially assembled in a substantially flat shape. The green tire thus built is then shaped to adopt the toroidal profile typical of tires. The so-called "finishing" semi-finished products are then applied to the green tire to obtain a product ready to be vulcanised.

Such a "conventional" type of method involves, particularly for the phase of building the green tire, the use of an anchoring element (generally a bead wire) which is used to anchor or hold the carcass reinforcement in the region of the beads of the tire. Thus, for this type of method, a portion of all the plies that make up the carcass reinforcement (or just part thereof) is wrapped around a bead wire positioned in the bead of the tire. This then anchors the carcass reinforcement in the bead.

The widespread use throughout industry of this conventional type of method, despite the numerous alternative variations used regarding the creation of the plies and assemblies, has led a person skilled in the art to employ terminology based on the method: hence the generally accepted terminology comprising notably the terms "plies", "carcass", "bead wire", "shaping" to denote the switch from a flat profile to a toroidal profile, etc.

Nowadays there are tires which do not strictly speaking have "plies" or "bead wires" as defined in the above definitions. For example, document EP 0 582 196 describes tires which are manufactured without the use of semi-finished products in the form of plies. For example, the reinforcing elements in the various reinforcing structures are applied directly to the adjacent layers of rubber compound, everything being applied in successive layers to a toroidal form the shape of which makes it possible to obtain directly a profile that can be likened to the final profile of the tire that is being built. Thus, in this case, there are no longer any "semi-finished products", or any "plies", or any "bead wires". The basic products, such as the rubber compounds and the reinforcing elements in the form of threads or filaments, are applied directly to the form. Because this form is of toroidal shape, the green tire no longer has to be shaped in order to change from a flat profile to a profile in the shape of a torus.

Furthermore, the tires described in that document do not have the "traditional" turning back of the carcass ply around a bead wire. That type of anchorage is replaced by an arrangement in which circumferential threads are positioned adjacent to the said sidewall reinforcing structure, everything being embedded in a rubber anchoring or cushioning compound.

There are also methods of assembly on a toroidal form that use semi-finished products which are specially designed for rapid, effective and simple laying on a central form. Finally, it is also possible to use a hybrid comprising both certain semi-finished products for creating certain architectural aspects (such as plies, bead wires, etc.), while others are achieved by the direct application of compounds and/or reinforcing elements.

In this document, in order to take account of recent technological advances both in the field of manufacture and in that of the product design, the conventional terms such as "plies", "bead wires", etc., are advantageously replaced by neutral terms or terms that are independent of the type of method used. Thus, the term "carcass-type reinforcement" or "sidewall reinforcement" is valid for denoting the reinforcing elements in a carcass ply in the conventional method and the corresponding reinforcing elements generally applied to the sidewalls of a tire produced using a method that does not employ semi-finished products. The term "anchoring region", for its part, can just as easily denote the "traditional" wrapping of the carcass ply around a bead wire in a conventional method as it can the assembly formed by the circumferential reinforcing elements, the rubber compound and the adjacent sidewall reinforcement portions of a bottom region produced using a method involving applying products to a toroidal form.

The longitudinal direction of the tire, or circumferential direction, is the direction corresponding to the periphery of the tire and defined by the direction in which the tire runs.

A circumferential plane or circumferential plane of section is a plane perpendicular to the axis of rotation of the tire. The equatorial plane is the circumferential plane that passes through the centre or crown of the tread strip.

The transverse or axial direction of the tire is parallel to the axis of rotation of the tire.

The radial direction is a direction that intersects the axis of rotation of the tire and is perpendicular thereto.

The axis of rotation of the tire is the axis about which it rotates in normal use.

A radial or meridian plane contains the axis of rotation of the tire.

As with all other tires, tires for motorbikes are switching over to a radial design, the architecture of such tires comprising a carcass reinforcement formed of one or two layers of reinforcing elements that make an angle possibly comprised between 65° and 90° with the circumferential direction, the said carcass reinforcement being radially surmounted by a crown reinforcement formed of reinforcing elements. There do, however, still remain some non-radial tires to which the invention also relates. The invention also relates to partially radial tires, that is to say tires in which the reinforcing elements of the carcass reinforcement are radial over at least part of the said carcass reinforcement, for example in the part corresponding to the crown of the tire.

Numerous crown reinforcement architectures have been proposed, depending on whether the tire is intended to be fitted at the front of the motorbike or at the rear. A first structure, for the said crown reinforcement, consists in using only circumferential cords, and the said structure is more particularly used for a rear tire. A second structure, taking its inspiration directly from the structures commonly employed in passenger vehicle tires, has been used to improve wear resistance and consists in using at least two working crown layers of reinforcing elements that are substantially mutually parallel within each layer but crossed from one layer to the next making acute angles with the circumferential direction, such tires being more particularly suited to the front of motorbikes. The said two working crown layers can be associated with at least one layer of circumferential elements, which are generally obtained by the helical winding of a strip of at least one rubber-coated reinforcing element.

The choice of crown architecture for the tires has a direct impact on certain tire properties such as wear, endurance, grip or even driving comfort or, particularly in the case of motorcycles, stability. However, other tire parameters such as the nature of the rubber compounds used in the tread strip also have an impact on the properties of the said tire. The choice and nature of the rubber compounds used in the tread strip are, for example, essential parameters regarding wear properties. The choice and nature of the rubber compounds used in the tread strip also have an impact on the grip of the tire.

SUMMARY OF THE INVENTION

It is an object of the invention to provide a tire that is able to improve the wear properties of the tire and to improve the grip properties of the tread of the said tire, in the case of motorcycle tires.

This object has been achieved according to one aspect of the invention directed to a tire comprising a reinforcing structure of the carcass type, formed of reinforcing elements anchored on each side of the tire to a bead the base of which is intended to be mounted on a rim seat, each bead being extended radially outwards by a sidewall, the sidewalls being joined radially towards the outside to a tread strip, and comprising under the tread strip a crown reinforcing structure comprised of at least two layers of reinforcing elements, the carcass-type reinforcing structure being produced in the form of two half-layers extending at least from the shoulders to the beads and each having an end under the tread strip, the crown reinforcing structure comprising at least one layer of circumferential reinforcing elements which are distributed in the transverse direction with a variable pitch and the pitch between the circumferential reinforcing elements being at a minimum in the region of the layer of circumferential reinforcing elements that radially face the ends of each of the half-layers of the carcass-type reinforcing structure.

A layer of circumferential reinforcing elements within the meaning of the invention consists of at least one reinforcing element oriented at an angle of less than 5° formed with the longitudinal direction.

The variation in the pitch between the circumferential reinforcing elements is embodied by a variation in the number of circumferential reinforcing elements per unit length in the transverse direction and, therefore, by a variation in the density of circumferential reinforcing elements in the transverse direction and therefore by a variation in the circumferential stiffness in the transverse direction.

The invention thus, by comparison with a conventional tire, plans to omit the carcass structure in at least part of that region of the tire that lies under the tread strip. Such a carcass structure may, for example, be produced in accordance with the teachings of document EP-A-0 844 106.

Further, the crown reinforcing structure of the tire according to an embodiment of the invention comprises at least one layer of circumferential reinforcing elements distributed in the transverse direction at a variable pitch, the pitch between the circumferential reinforcing elements being at a minimum in the region of the layer of circumferential reinforcing elements radially facing the ends of each of the half-layers of the carcass-type reinforcing structure. In other words, the density of the circumferential reinforcing elements is greater facing the ends of the half-layers of the carcass-type reinforcing structure and therefore the density of the circumferential reinforcing elements increases from one end of the said layer of circumferential reinforcing elements as far as the region facing one end of a half-layer of the carcass-type reinforcing structure then decreases from the said region as far as the crown of the tire.

According to a first embodiment of the invention, the pitch between the circumferential reinforcing elements at the centre (crown) of the tread strip is less than at the edges of the said layer. Such an embodiment according to the invention notably encourages resistance towards external attack which is greatest in the central region of the tire.

According to a second embodiment of the invention, the pitch between the circumferential reinforcing elements at the centre (crown) of the tread strip is greater than at the edges of the said layer. Such an embodiment according to the invention notably encourages the flattening of the tire at high camber angles.

According to a preferred embodiment of the invention, the value of the pitch in the transverse direction obeys a series over at least one part of the axial width of the said layer.

According to a first embodiment, the value of the pitch obeys an arithmetic series of the type $U(n)=U_0+nr$, where $U_0$ is comprised between 0.4 mm and 2.5 mm, and r is the common difference of the series comprised between 0.001 and 0.1.

According to a second embodiment, the value of the pitch obeys a geometric series of the type $U(n)=U_0 * r^n$, where $U_0$ is comprised between 0.4 mm and 2.5 mm, and r is the common difference of the series comprised between 1.001 and 1.025.

According to other embodiments of the invention, the value of the pitch may be a combination of several progressions depending on the axial position in the said layer.

According to a preferred embodiment of the invention, each of the half-layers of the carcass-type reinforcing structure is radially adjacent to the edge of at least one working crown layer, the axial distance between one end of the said working crown layer and the end of the half-layer radially adjacent to the said end of the working crown layer being greater than 20 mm.

Such an embodiment of the invention allows for optimum reaction of forces in the axial direction by at least one working crown layer adjacent to the half-layers of the carcass-type reinforcing structure.

For preference also, in order to optimize the distance between the ends of the half-layers of the carcass-type reinforcing structure, this distance is equal to the width of a working crown layer adjacent to the half-layers of the carcass-type reinforcing structure, reduced by 40 mm A tire thus produced according to the invention makes it possible to improve the performance in terms notably of wear and of transmission of torque, because of the absence of carcass reinforcing structure in the crown of the tire and because of the presence of at least one layer of circumferential reinforcing elements the density of which is at a maximum in the region of the layer of circumferential reinforcing elements that radially faces the ends of each of the half-layers of the carcass-type reinforcing structure; specifically, the absence of carcass-type reinforcing structure in the crown of the tire allows better flattening of the tire which is good for wear and for the transmission of torque. The maximum density of the reinforcing elements directed circumferentially in the region radially facing the ends of each of the half-layers of the carcass-type reinforcing structure encourages the reaction of loads at the ends of half-layers of the carcass-type reinforcing structure and contributes to improving tire performance.

One advantageous embodiment of the invention makes provision that the layer of circumferential reinforcing elements is positioned at least partially radially on the outside of a working layer. When the layer of circumferential reinforcing elements is produced radially on the outside of two working layers and placed directly under the tread strip, it may notably contribute to improving high-speed stability.

The layer of circumferential reinforcing elements may thus be produced directly under the tread strip in order, in addition to performing its main function, to form a layer that protects the carcass and the other layers of the crown reinforcing structure against potential mechanical attack.

The layer of circumferential reinforcing elements may also be produced between the working layers, notably for economic reasons, because this reduces the amount of material and laying time required.

Another advantageous embodiment of the invention makes provision that the layer of circumferential reinforcing elements is positioned at least partially radially on the inside of the radially innermost working layer. In this embodiment, the layer of circumferential reinforcing elements is produced radially on the inside of the working layers and may notably make it possible to improve the grip and traction of the tire still further.

Another alternative form of the invention makes provision that at least one layer of circumferential reinforcing elements is positioned at least partially radially on the inside of the carcass-type reinforcing structure.

A tire according to the invention, notably when at least part of the crown reinforcing structure, such as a layer of circumferential reinforcing elements, is produced radially on the inside of the carcass structure, is advantageously produced using a manufacturing technique of the type involving a hard core or stiff form.

For preference also, the reinforcing elements of the layer of circumferential reinforcing elements are made of metal and/or textile and/or glass. The invention notably makes provision for the use of reinforcing elements of different natures within a single layer of circumferential reinforcing elements.

For preference also, the reinforcing elements of the layer of circumferential reinforcing elements have an elastic modulus in excess of 6000 N/mm$^2$.

In an advantageous alternative form of the invention, one layer of circumferential reinforcing elements may be produced in several parts positioned at different radial positions or different levels in the tire. Such a tire may notably comprise part of the layer of circumferential reinforcing elements radially on the outside of the other reinforcing elements in the central part of the tire, that is to say under the central part of the tread strip. This part of the layer of circumferential reinforcing elements then notably affords the carcass protection against potential attack that may occur in the central part of the tread strip, which is considered to be the most exposed. Lateral parts of the layer of circumferential reinforcing elements, independent of the central part of the said layer of circumferential reinforcing elements, may be positioned at all levels, that is to say either radially on the inside of the working layers or between them or, alternatively, radially on the inside of the carcass layer, notably with a view to reducing the amount of reinforcing elements and the time taken to produce such a layer of circumferential reinforcing elements. The invention further makes provision that, in the case of a layer of circumferential reinforcing elements which is produced in several parts positioned at different radial positions, the distribution of these various parts is not symmetric with respect to the equatorial plane, or circumferential plane, passing through the centre of the crown of the tire. Such an asymmetric distribution may be further associated with a choice of different materials for the circumferential reinforcing elements.

According to this type of embodiment of a layer of circumferential reinforcing elements which is broken down into several parts, the invention advantageously plans for the axial ends of the said parts to overlap one another.

According to a preferred embodiment of the invention, the reinforcing elements of the carcass-type reinforcing structure make an angle comprised between 65° and 90° with the circumferential direction.

According to an alternative form of the invention, the crown reinforcing structure comprises at least two layers of reinforcing elements, the portions making angles comprised between 20 and 160° with one another, from one layer to the next, and preferably greater than 40°.

According to a preferred embodiment of this alternative form of the invention, at least in the central region of the tread strip, the reinforcing elements of a working layer make angles, formed with the longitudinal direction, which are identical, the said angles being measured at the points of intersection with a circumferential plane, whatever the said circumferential plane might be. In other words, for a given circumferential plane of section, the reinforcing elements are all at the same angle formed with the longitudinal direction at the points of intersection with the said circumferential plane of section. Moreover, the aforementioned angle may vary according to the circumferential plane of section considered.

For preference also according to this alternative form of the invention, at least in the central region of the tread strip, the reinforcing elements of one working layer are equidistant from one another in all circumferential planes; the distance separating adjacent reinforcing elements being able for its part to vary according to the circumferential plane of section considered or, more specifically, it being possible for the distance between adjacent reinforcing elements to vary in the axial direction.

Another alternative form of embodiment of the invention makes provision that at least one working layer is produced at least partially radially on the inside of the carcass-type reinforcing structure. This alternative form of embodiment may also re-utilize the various positionings mentioned hereinabove with respect to a layer of circumferential reinforcing elements. The carcass may thus cover the entire crown reinforcing structure. For preference, the invention makes provision that at least one layer of crown reinforcement is positioned between the carcass and the tread strip in order to protect the carcass.

According to a first embodiment of the invention, all of the working layers are produced radially on the inside of at least one carcass structure, i.e. on the inside of at least one carcass layer. At least one carcass-type reinforcing structure thus radially covers the entire crown reinforcing structure.

According to a second preferred embodiment of the invention, at least one layer of working reinforcing elements of the crown reinforcing structure is produced radially on the outside of the carcass-type reinforcing structure. According to this second o embodiment of the invention, the layer of working reinforcing elements assumes a function of protecting the carcass and the other layers of the crown reinforcing structure against possible mechanical attack. Further, load in the axial direction is then reacted by two working crown layers adjacent to the half-layers of the carcass-type reinforcing structure.

It should be noted, as stated previously, that a tire according to the invention, notably when at least part of the crown reinforcing structure is produced radially on the inside of the carcass structure, is advantageously produced using a manufacturing technique of the type using a hard core or stiff form.

According to an alternative form of embodiment of the invention, at least one layer of working reinforcing elements is made up of at least one continuous reinforcing thread which, in the central region of the said layer, forms portions making identical angles with the longitudinal direction, the said angles being measured at the points of intersection with a circumferential plane, two adjacent portions being connected by a loop, and the portions making an angle comprised between 10 and 80°, and preferably greater than 20°, with the longitudinal direction.

The term "thread" denotes, very generally, both monofilaments, multifilament fibres (possibly twisted on themselves) or assemblies such as textile or metal cords, folded yarns or alternatively any type of equivalent assembly, for example a hybrid cord, irrespective of the material or materials or potential treatment of these threads, for example a surface treatment or coating, or precoating to encourage adhesion to the rubber or any other material.

According to this advantageous alternative form of the invention, the working layer is produced with at least one thread no free end of which is present on the edges of the said layer. For preference, the layer is produced using a single thread and the layer is of the "single thread" type. However, industrial production of such layers leads to discontinuities notably as a result of changes of reel. A preferred embodiment of the invention further consists in using just one or a small number of threads for a working layer and the starts and ends of threads need to be positioned in the central region of the said layer.

A tire according to the invention thus produced comprises a reinforcing structure that has no free end of the reinforcing elements at the axially outer edges of the working layers.

The studies conducted notably revealed that the presence of traditional layers of reinforcing elements set at an angle to the longitudinal direction leads to local, circumferential and shear, stiffnesses which decrease as the edges of the said layers are neared, the tension at the ends of the reinforcing elements being zero. Zero local tension in the reinforcing elements results in lower effectiveness of the said reinforcing elements in this region. Now, the stiffnesses of the edges of the layers are particularly high when the tire is used at steeper camber angles, under cornering, the part of the tire corresponding to these regions then facing the ground.

The creation of motorcycle tires leads to high values of curvature when the said tires are used at camber angles. A tire produced according to this alternative form of the invention and which comprises a reinforcing structure that has no free end of the reinforcing elements in the region of the axially outer edges of the working layers thus notably allows the grip and traction of the tires to be enhanced for use at steep camber angles.

Such a tire is advantageously produced using a technique of the type using a hard form or a toroidal form, which notably allows the reinforcing elements to be laid in the near-final position; specifically, a shaping step is not required with this type of method, which means that the reinforcing elements are no longer shifted once they have been laid.

In one advantageous embodiment of the invention, notably with a view to further optimizing the stiffnesses of the reinforcing structure along the meridian plane of the tire, particularly at the edges of the working layers, the angles formed by the said portions of the thread in the working layers with the longitudinal direction can vary in the transverse direction such that the said angles are greater on the axially outer edges of the layers of reinforcing elements by comparison with the angles of the said portions measured at the equatorial plane of the tire.

The use of a technique of the type using a hard form which notably allows the reinforcing elements to be laid in the near-final position without the need for a shaping step has further advantages. Specifically, a technique of the hard form type in particular allows markedly greater variations in angles than can be obtained using methods that involve a shaping step to be achieved in a simple way. Further, the said variations in angle, the said angle tending towards 90° at the edges of the working layers, leads to an increase in the pitch and encourages the creation of loops, because of the reduction in bulk.

A first embodiment of the alternative forms of embodiment of the invention whereby the angles formed by the said portions of the thread in the working layers with respect to the longitudinal direction can vary in the transverse direction, consists in varying the angle of the portions monotonously from the equatorial plane of the tire as far as the edges of the working layer.

A second embodiment of these alternative forms consists in having the angle change in steps from the equatorial plane of the tire as far as the edges of the working layer.

A final embodiment of these alternative forms consists in allowing the angle to evolve in such a way that given values are obtained for given axial positions.

These various embodiments of the alternative forms of embodiment of the invention whereby the angles formed by the said portions of the thread of the working layers with respect to the longitudinal direction can vary in the transverse direction in other words make it possible to obtain good circumferential stiffness of the crown reinforcing structure through the presence of tight, that is to say small, angles in the region of the crown of the tire, that is to say in the region flanking the equatorial plane. Further, on the other hand, the presence of open angles, that is to say angles tending towards 45°, or, even beyond, tending towards 90°, can be obtained on the edges of the working layer or, more exactly, at the shoulders of the tire in order to improve the grip, traction, comfort or else the operating temperature of the tire; specifically, such variations in angle make it possible to modulate the shear stiffnesses of the working layers.

According to one preferred embodiment of the invention, the reinforcing elements of the working layers are made of a textile material.

According to another embodiment of the invention, the reinforcing elements in the working layers are made of metal.

BRIEF DESCRIPTION OF THE DRAWINGS

Further details and advantageous features of the invention will emerge hereinafter from the description of the exemplary embodiments of the invention, given with reference to FIGS. 1 to 3 which depict:

For ease of understanding, FIGS. 1 to 3 are not drawn to scale.

DETAILED DESCRIPTION OF THE DRAWINGS

Figure 1:
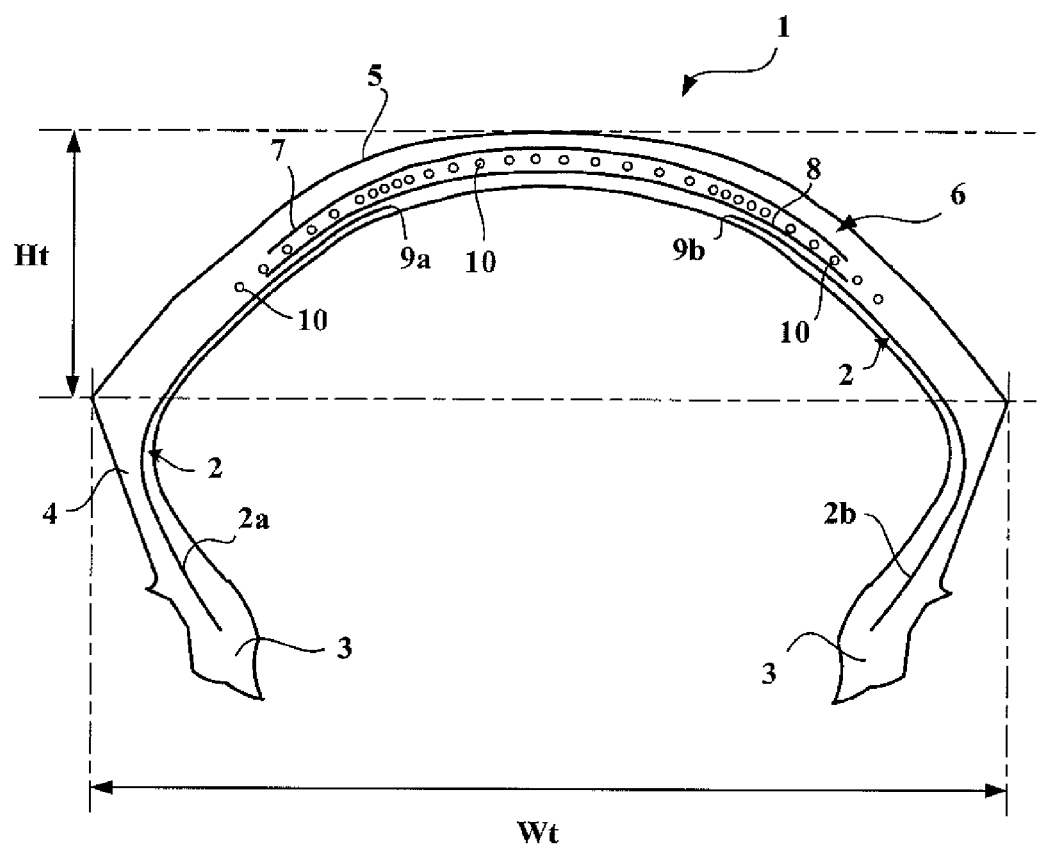
FIG. 1: a meridian view of a tire layout according to a first embodiment of the invention.

FIG. 1 depicts a tire 1 comprising a carcass reinforcement consisting of a layer 2 comprising reinforcing elements of the textile type. The layer 2 consists of reinforcing elements arranged radially. The radial positioning of the reinforcing elements is defined by the angle at which the said reinforcing elements are laid; a radial arrangement corresponds to the said elements being laid at an angle comprised between 65° and 90° with respect to the longitudinal direction. The layer 2 is made up of two half-layers 2a, 2b that form a circumferential region of the tire 1 that has no carcass reinforcement and that is axially delimited by the ends of 9a, 9b of each of the half-layers 2a, 2b.

Each of the half-layers 2a, 2b is anchored on each side of the tire 1 in a bead 3 the base of which is intended to be mounted on a rim seat. Each bead 3 is extended radially outwards by a sidewall 4, the said sidewall 4 radially towards the outside meeting the tread strip 5. The tire 1 thus constructed has a curvature value in excess of 0.15 and preferably in excess of 0.3. The curvature value is defined by the Ht/Wt ratio, namely the ratio of the height of the tread strip to the maximum width of the tread strip of the tire. The curvature value will advantageously be between 0.25 and 0.5 for a tire intended to be fitted at the front of a motorcycle and will be advantageously comprised between 0.2 and 0.5 for a tire intended to be fitted at the rear.

The tire 1 further comprises a crown reinforcement 6 consisting of two layers 7 and 8 of reinforcing elements making angles with the circumferential direction, the said reinforcing elements being crossed from one layer to the next and making angles of 50° between them in the region of the equatorial plane, the reinforcing elements of each of the layers 7 and 8 making an angle of 25° to the circumferential direction.

The reinforcing elements of the two layers 7 and 8 are made of a textile material and, more specifically, of aramid.

The crown reinforcement 6 according to the invention comprises a layer of circumferential reinforcing elements 10 radially between the two working layers 7, 8. The layer of circumferential reinforcing elements 10 advantageously consists of a single thread which has been wound to make an angle substantially equal to 0° with the longitudinal direction. The layer of circumferential reinforcing elements may alternatively be produced by the simultaneous winding of several bare threads or threads in the form of strips when they are embedded in rubber.

The layer of circumferential reinforcing elements 10 consists of textile reinforcements of the aramid 167/3 type.

In accordance with the invention, the circumferential reinforcing elements 10 are wound in such a way that the pitch between two circumferential reinforcing elements varies in the axial direction, the pitch being at a minimum in the region facing the ends 9a, 9b of each of the half-layers 2a, 2b, and thus such that the density is greater in the region facing the said ends 9a, 9b. The circumferential reinforcing element densities will therefore decrease, firstly from these regions with a density of 85 threads/dm towards the central part of the tire with a density of 60 threads/dm, and secondly, from these regions towards the lateral parts of the said layer of circumferential reinforcing elements 10 with a density of 70 threads/dm.

The presence of a layer of circumferential reinforcing elements in the tire notably makes it possible to further improve performance in terms of endurance. The distribution at a variable pitch in accordance with the invention and as shown in FIG. 1 allows the circumferential stiffnesses of the crown reinforcement of the tire to be modulated in order to optimize the compromises between flattening, wear and high-speed performance.

Greater rigidity facing the ends 9a, 9b of the half layers 2a, 2b provides a transition between that part of the contact patch that faces the layers of carcass reinforcement and that part of the contact patch that faces only the reinforcing layers of the crown reinforcement.

Figure 2:
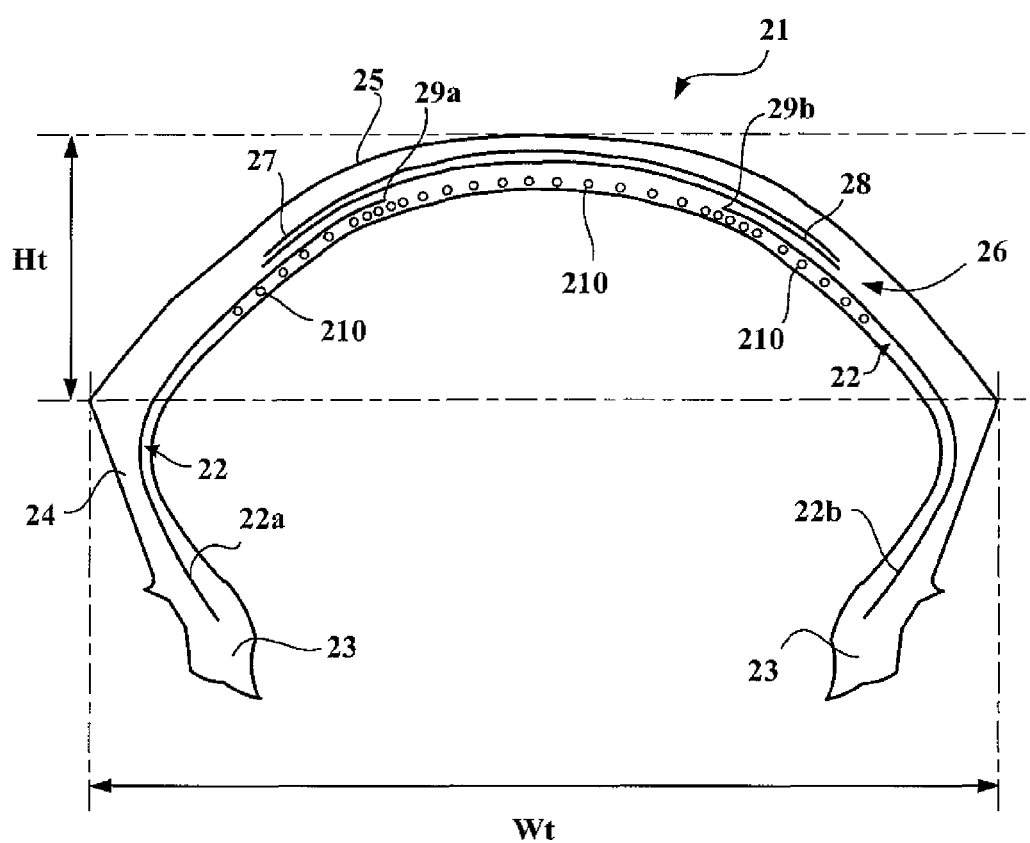
FIG. 2: a meridian view of a tire layout according to a second embodiment of the invention.

FIG. 2 depicts a tire 21 similar to that of FIG. 1 and which differs therefrom in the radial position of the layer of circumferential reinforcing elements 201. In this second depiction according to the invention, the layer of circumferential reinforcing elements 210 has been positioned radially on the inside of the carcass reinforcement and therefore radially on the inside of the two working layers 27, 28. This radial position of the layer of circumferential reinforcing elements 210 allows in particular a further improvement in the grip and traction properties of the tire.

Figure 3:
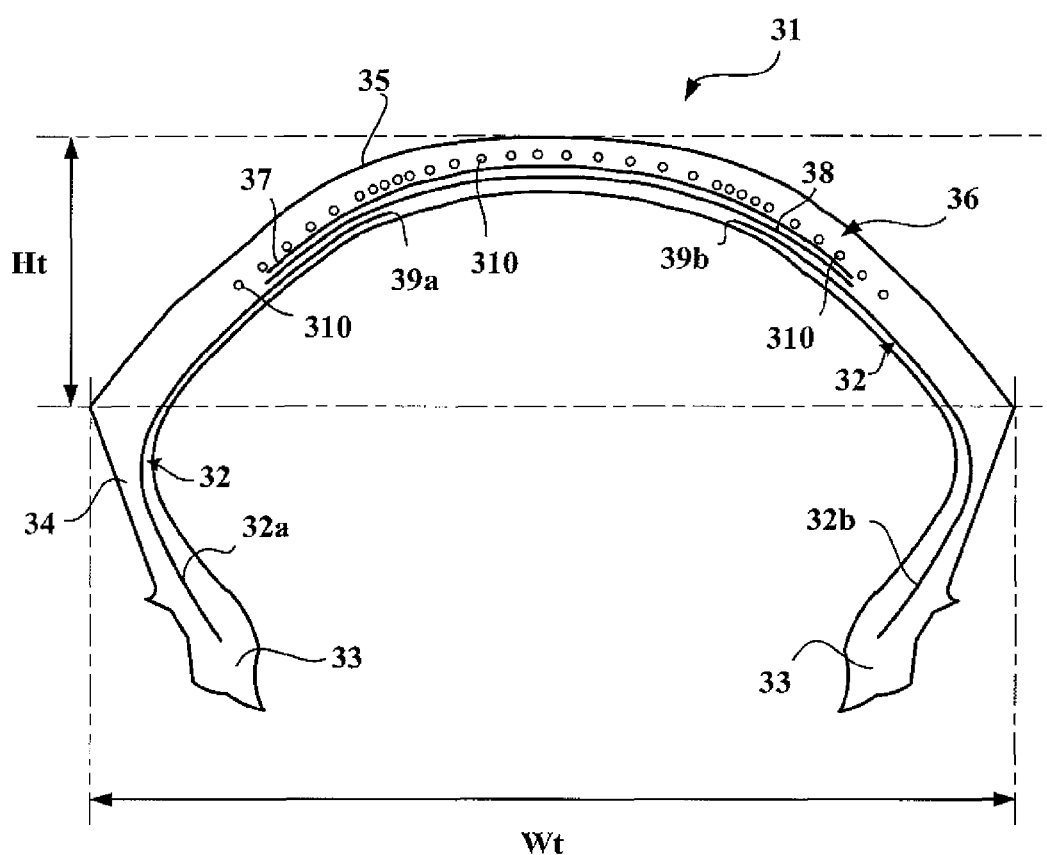
FIG. 3: a meridian view of a tire layout according to a third embodiment of the invention.

FIG. 3 depicts a tire 31 similar to that of FIGS. 1 and 2 and which differs therefrom in terms of the radial position of the layer of circumferential reinforcing elements 310. In this third depiction in accordance with the invention, the layer of circumferential reinforcing elements 310 has been placed radially on the outside of the two working layers 37, 38. The layer of circumferential reinforcing elements 310 is thus the radially outer part of the crown reinforcement 36 and the two working layers 37, 38 are interposed between the carcass layer 32 and the layer of circumferential reinforcing elements 310. This radial position of the layer of circumferential reinforcing elements 310 notably allows an improvement in the high-speed stability of the tire. It also acts as a protective layer protecting the carcass reinforcement 32 and the crown reinforcement 36 against possible mechanical attack.

The invention should not be interpreted as being restricted to the description of the examples above. The invention notably also encompasses tires that may have more complex crown reinforcements, for example comprising 3 or more working layers of reinforcing elements making an angle with the circumferential direction.

The invention also applies to the various types of crown reinforcement listed hereinabove and notably those described in patent applications WO 2004/018236, WO 2004/018237, WO 2005/070704, WO 2005/070706, notably exhibiting the various radial positions of the layers that make up the crown reinforcement relative to one another, and their radial position with respect to the carcass structure, plus also the makeup of a layer formed of a thread constituting portions connected by loops or even varied angles formed by the said portions with the axial direction.

The invention claimed is:

1. A tire comprising:
   a carcass-type reinforcing structure formed of reinforcing elements and anchored to beads on both sides of the tire, each of said beads having a base configured to be mounted on a rim seat, said beads being extended radially outwards by sidewalls, said sidewalls being joined radially towards the outside to a tread strip; and a crown reinforcing structure formed under said tread strip and comprising at least two layers of reinforcing elements, wherein said carcass-type reinforcing structure comprises at least two half-layers extending at least from shoulders of the tire to said beads, each of said at least two half-layers having one end under said tread strip, wherein said crown reinforcing structure comprises at least one layer of circumferential reinforcing elements that are distributed in a transverse direction with a variable pitch, wherein said variable pitch between said circumferential reinforcing elements is at a minimum in a region of said at least one layer of circumferential reinforcing elements that radially faces said one end of each of said at least two half-layers of the carcass-type reinforcing structure under said tread strip, and wherein at least one of the following conditions apply:

(i) said variable pitch of said circumferential reinforcing elements decreases beginning from one end of said at least one layer of circumferential reinforcing elements and extending to said region radially facing said one end of each of said at least two half-layers under said tread strip, and a value of said variable pitch obeys an arithmetic series of a type U(n)=Uo+nr, where Uo is in a range of 0.4 mm and 2.5 mm, and r is a common difference of said arithmetic series that is in a range of 0.001 and 0.1, and (i) the pitch increases from said region to a crown of the tire, and a value of said variable pitch obeys an arithmetic series of a type U(n)=Uo+nr, where Uo is in a range of 0.4 mm and 2.5 mm, and r is a common difference of said arithmetic series that is in a range of 0.001 and 0.1.

2. The tire according to claim 1, wherein said variable pitch between said circumferential reinforcing elements at the centre of said tread strip is greater than at the ends of said at least one layer of circumferential reinforcing elements.

3. The tire according to claim 1, wherein said variable pitch between said circumferential reinforcing elements at the centre of said tread strip is less than at the ends of said at least one layer of circumferential reinforcing elements.

4. The tire according to claim 1, wherein each of said at least two half-layers of said carcass-type reinforcing structure is radially adjacent to the edge of at least one working crown layer, and wherein an axial distance between one end of said at least one working crown layer and an end of each of said at least two half-layers radially adjacent to said one end of said at least one working crown layer is greater than 20 mm.

5. The tire according to claim 1, wherein said reinforcing elements of said carcass-type reinforcing structure make an angle of between 65° and 90° with a circumferential direction.

6. The tire according to claim 1, wherein said crown reinforcing structure comprises at least two layers of reinforcing elements, and wherein reinforcing elements of one of said at least two layers and reinforcing elements of a layer next to said one of said at least two layers make an angle of between 20 and 160° with each other.

* * * * *